United States Patent Office 3,210,616
Patented Oct. 5, 1965

3,210,616
SOLENOID MECHANISMS
Arthur C. Severn, Burnley, England, assignor to Joseph Lucas (Industries) Limited, Birmingham, England
Filed Oct. 4, 1962, Ser. No. 228,344
Claims priority, application Great Britain, Oct. 6, 1961, 35,982/61
3 Claims. (Cl. 317—176)

The object of this invention is to provide a solenoid in a convenient form.

A solenoid in accordance with the invention comprises in combination a winding, an armature within the winding, a screw-threaded bore within the armature, a screw-threaded stem which at one end is in screw-threaded engagement with the armature, means for preventing the stem from moving angularly so that the amount by which the stem extends from the winding when the solenoid is energized can be adjusted by angular movement of the armature, and means engageable with the armature for preventing angular movement thereof.

Figure 1:
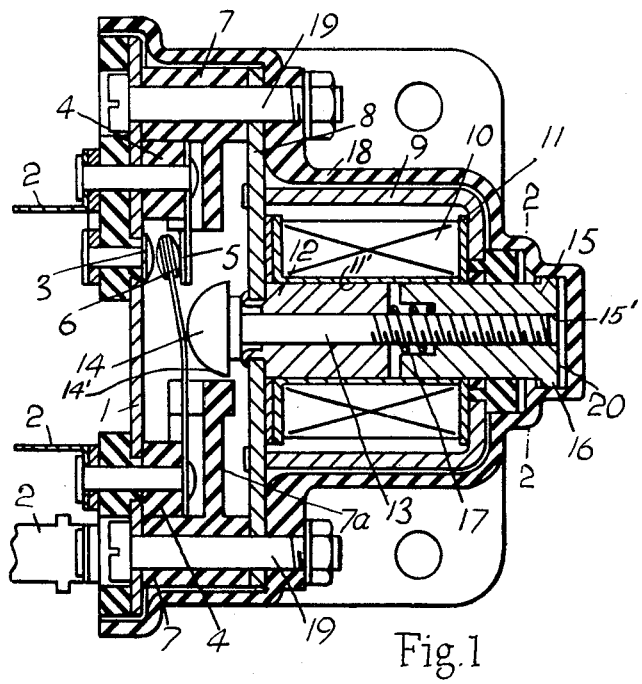
FIGURE 1 is a sectioned side elevation.
Figure 2:
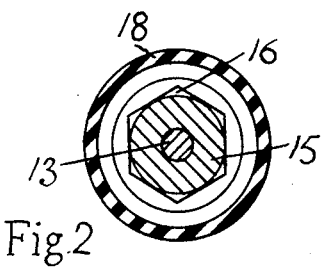
FIGURE 2 is a sectioned end elevation on the line 2—2 of FIGURE 1 of a relay in accordance with the invention.

Referring to the drawings there is provided a base plate 1 which on one side carries contacts 2 adapted for connection to an external circuit, and on its other side carries one or more fixed contact pieces 3. Mounted on said other side are a pair of spaced insulating blocks 4 one of which carries further fixed contact pieces 5 and the other of which carries contact pieces 6 which normally contact the fixed contact pieces 5 on the block but can be moved into contact with the contact pieces 3 on the base plate.

Spaced from the base plate by insulating spacing blocks 7 is a metallic plate 8 which itself supports a U-shaped bridge member 9, while within the space between the bridge member and plate is the winding 10 of a solenoid, the winding being wound on a former 11 having a cylindrical bore 11' which is closed at one end by a hollow sleeve 12. Extending through this sleeve and an aperture in the plate 8 into the bore 11' is one end of a screw-threaded stem 13 which at its other end carries a shoe 14 adapted to engage with the movable contact pieces 6.

The screw-threaded stem 13 is in threaded engagement with a bore 15' formed in the armature 15 of the solenoid, the end 16 of the armature extending from the bore 11' being of square or other non-circular cross-section.

Figure 3:
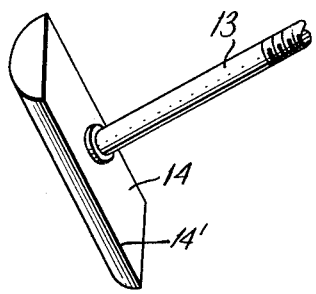
FIG. 3 is a view in perspective showing one element of the invention.

A rib 7a is carried by one of the insulating blocks 7 and the rib 7a terminates in close proximity to the edge 14' of the shoe 14, as clearly shown in FIG. 1. As shown in FIG. 3, the shoe 14 is an elongated half-round bar which is secured to the stem 13 at right angles thereto and, in effect, provides a T-head on the stem 13. The rib 7a extends for an appreciable distance along the shoe 14 and, therefore, any appreciable movement of the shoe 14 about the axis of the stem 13 is prevented by engagement of the edge 14' of the shoe 14 with the upper surface of the rib 7a. As a result, the axial position of the shoe 14 with respect to the armature 15 may be conveniently adjusted by rotating the armature 15 and since the shoe 14 and stem 13 are held against any appreciable rotation by engagement of the edge 14' of the shoe 14 with the rib 7a the threaded engagement between the stem 13 and the armature 15 will provide for axial movement and adjustment of the shoe 14 with respect to the armature 15. A spring 17 surrounds the stem 13 to urge the armature 15 and stem 13 toward the right as viewed in FIG. 1.

The winding 10 and insulating blocks 7 are housed within a hollow cover 18 which rests on the metallic plate 8 and is secured in place by screws 19 extending through the insulating blocks 7. Within the cover is formed a recess 20 of complementary cross-section to the end 16 of the armature, and the arrangement is such that when the cover is in position the end of the armature is engaged within the recess, thereby locking the armature against angular movement. The cover 18 may be removed to permit rotation of the armature 15 for adjustment purposes.

Having thus described my invention what I claim as new and desire to secure by Letters Patent is:

1. A solenoid mechaism comprising in combination, a winding, an armature slidably mounted within the winding, said armature having an end portion of non-circular cross-section extending beyond the winding, a screw-threaded bore defined within the armature, a screw-threaded stem adjustably engaged within the bore, a shoe rigidly united with the free end of the stem, means for preventing appreciable rotation of the shoe whereby the amount by which the shoe extends from the winding when the latter is energized can be adjusted by moving the armature angularly, a detachable cover for the winding, and a recess defined in said cover, the shape of said recess being complementary to that of said end portion of the armature and the edges of said recess co-operating, when the cover is in position, with said end portion of the armature to prevent angular movement thereof.

2. A solenoid mechanism comprising in combination a plate, a bridge member secured to the plate, an annular winding supported by the bridge member, a hollow sleeve mounted within a portion of the winding and united with said plate, an armature slidable within said winding, the movement of said armature when the winding is energized being limited by said sleeve, said armature having an end portion of non-circular section, a screw-threaded bore defined within the armature, a screw-threaded stem adjustable engaged within the bore, said stem extending through the sleeve, a shoe rigidly united with said stem, means carried by the plate for engaging and preventing appreciable rotation of the shoe, whereby the amount by which the shoe projects from the plate when the winding is energized can be adjusted by angular movement of the armature, a detachable cover for enclosing the winding and bridge member, a recess defined in said cover, said recess having a non-circular shape complementary to that of said end portion of the armature and the edges of said recess co-operating, when the cover is in position, with said end portion of the armature to prevent angular movement thereof.

3. A solenoid mechanism comprising in combination a plate, a bridge member secured to the plate, an annular winding supported by the bridge member, a hollow sleeve mounted on the plate and extending into a portion of said winding, an armature slidable within said winding, the movement of said armature when the winding is energized being limited by said sleeve, said armature having an end portion of non-circular cross-section extending from the winding, a screw threaded bore defined within the armature, a screw threaded stem adjustably engaged within the bore, said stem extending through the sleeve, a shoe rigidly united with said stem, a base plate, fixed contacts carried on the base plate, movable contacts mounted on blades and carried by said base plate for co-operation with said fixed contacts, spacing blocks serving to space the base plate and the plate, said spacing blocks being of a thickness to allow the shoe to bear upon on said blades, a rib formed integrally with one of the spacing blocks, said rib serving to engage and prevent appreciable rotation of the shoe, whereby the amount by which the shoe projects from the plate and hence the amount of movement which can be imparted to the moving contacts when the winding is energized can be adjusted by angular movement of the armature, a detachable cover for enclosing the mechanism, a recess defined in said cover, said recess having a non-circular shape complementary to that of said end portion of the armature and the edges of said recess co-operating, when the cover is in position, with said end portion of the armature to prevent angular movement thereof.

References Cited by the Examiner

UNITED STATES PATENTS

| 2,380,262 | 7/45 | Quinnell et al. | 317—176 |
|---|---|---|---|
| 3,005,890 | 10/61 | White et al. | 200—87 |

FOREIGN PATENTS 160,224  8/57  Sweden.

BERNARD A. GILHEANY, *Primary Examiner.*

JOHN F. BURNS, *Examiner.*